United States Patent
Levy et al.

(10) Patent No.: US 9,479,620 B2
(45) Date of Patent: Oct. 25, 2016

(54) PACKET PARSING AND KEY GENERATION IN A NETWORK DEVICE

(71) Applicant: Marvell Israel (M.I.S.L) Ltd., Yokneam (IL)

(72) Inventors: Gil Levy, Hod Hasharon (IL); Aron Wohlgemuth, Givat Shmuel (IL)

(73) Assignee: Marvell World Trade Ltd., St. Michael (BB)

( * ) Notice: Subject to any disclaimer, the term of this patent is extended or adjusted under 35 U.S.C. 154(b) by 54 days.

(21) Appl. No.: 14/516,500

(22) Filed: Oct. 16, 2014

(65) Prior Publication Data

US 2015/0110113 A1    Apr. 23, 2015

Related U.S. Application Data

(60) Provisional application No. 61/892,105, filed on Oct. 17, 2013.

(51) Int. Cl.
 H04L 12/56 (2006.01)
 H04L 29/06 (2006.01)
 H04L 12/741 (2013.01)

(52) U.S. Cl.
 CPC ............. H04L 69/22 (2013.01); H04L 45/745 (2013.01); H04L 69/18 (2013.01)

(58) Field of Classification Search
 None
 See application file for complete search history.

(56) References Cited

U.S. PATENT DOCUMENTS

| | | | |
|---|---|---|---|
| 6,665,725 B1 * | 12/2003 | Dietz | G06F 17/30985 370/389 |
| 7,924,860 B1 | 4/2011 | Frailong et al. | |
| 8,111,690 B2 | 2/2012 | Hussain et al. | |
| 2002/0163909 A1 * | 11/2002 | Sarkinen | H04Q 11/04 370/386 |
| 2003/0210702 A1 | 11/2003 | Kendall | |
| 2008/0095149 A1 * | 4/2008 | Dai | H04L 49/3009 370/389 |
| 2008/0114887 A1 | 5/2008 | Bryers et al. | |
| 2008/0232374 A1 * | 9/2008 | Kopelman | H04L 69/22 370/392 |
| 2010/0150158 A1 | 6/2010 | Cathey et al. | |
| 2011/0149966 A1 | 6/2011 | Pope et al. | |
| 2012/0002546 A1 | 1/2012 | Sundararaman et al. | |

(Continued)

FOREIGN PATENT DOCUMENTS

WO    99/07180 A2    2/1999

OTHER PUBLICATIONS

U.S. Appl. No. 14/092,521, filed Nov. 27, 2013.
U.S. Appl. No. 14/482,980, filed Sep. 10, 2014.
Shpiner et al., "Reducing the Reordering Delay in Multi-Core Network Processors", Technical Report TR12-01, Com net, Technion, Israel, Jan. 2012, 12 pages.
U.S. Appl. No. 14/574,088, Levy et al., "Increasing Packet Processing Rate in a Network Device," filed Dec. 17, 2014.

(Continued)

*Primary Examiner* — Anh-Vu Ly

(57) ABSTRACT

A packet being processed by a network device is parsed by a programmable processing unit executing computer readable instructions stored in a non-transitory computer readable storage medium. Parsing the packet includes identifying one or more protocol layers within a header of the packet, identifying respective locations of protocol headers within the header of the packet, and providing the respective identified locations of protocol headers within the header of the packet to a hardware key generator block. A lookup key corresponding to the packet is generated by the key generator block using the respective identified locations. Generating the lookup key includes extracting, using an identified location of a protocol header, one or more fields from the corresponding protocol header. The lookup key is provided to a lookup engine. A lookup operation with respect to the packet is performed by the lookup engine and based on the lookup key.

20 Claims, 8 Drawing Sheets

(56) References Cited

U.S. PATENT DOCUMENTS

| | | |
|---|---|---|
| 2012/0177047 A1 | 7/2012 | Roitshtein |
| 2014/0169378 A1 | 6/2014 | Shumsky et al. |
| 2014/0177470 A1 | 6/2014 | Roitshtein et al. |
| 2014/0192815 A1 | 7/2014 | Shumsky et al. |
| 2015/0071079 A1 | 3/2015 | Kadosh et al. |
| 2015/0113190 A1 | 4/2015 | Wohlgemuth et al. |
| 2015/0172188 A1 | 6/2015 | Levy et al. |

OTHER PUBLICATIONS

U.S. Appl. No. 14/610,834, Levy et al., "Packet Distribution with Prefetch in a Parallel Processing Network Device," filed Jan. 30, 2015.

International Search Report and Written Opinion in International Application No. PCT/IB2014/002623, dated Feb. 23, 2015 (9 pages).

Wohlgemuth, et al, "Processing Concurrency in a Network Device," U.S. Appl. No. 14/516,529, filed Oct. 16, 2014.

* cited by examiner

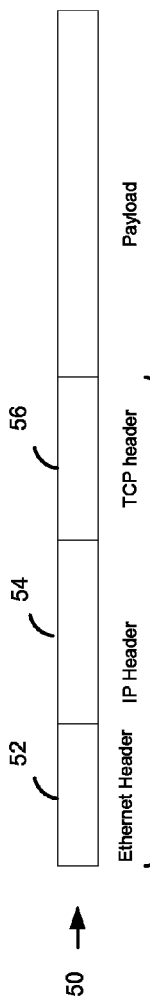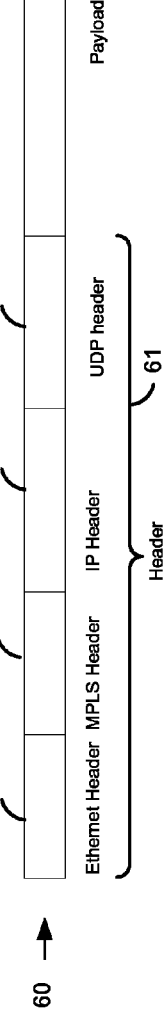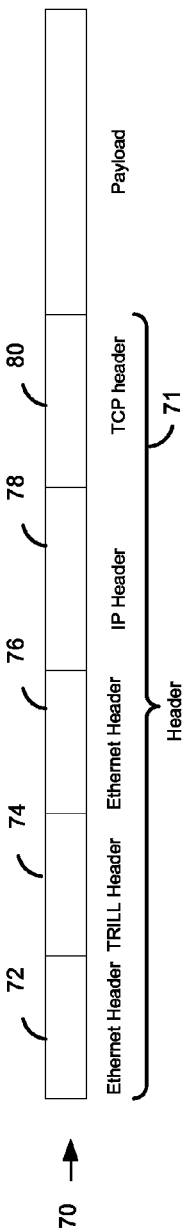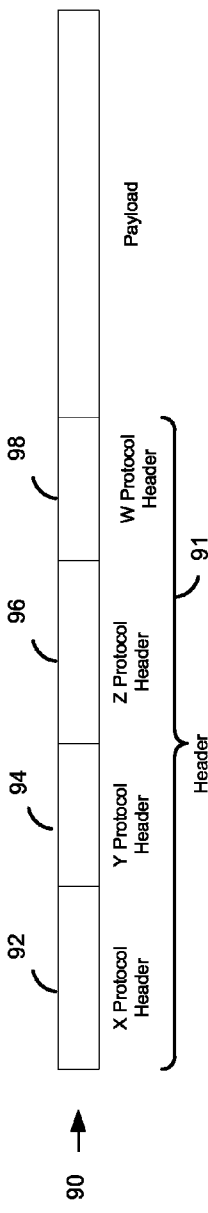

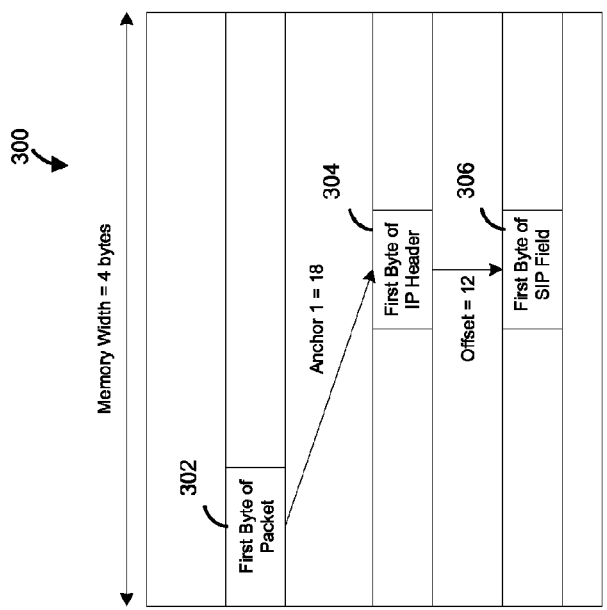
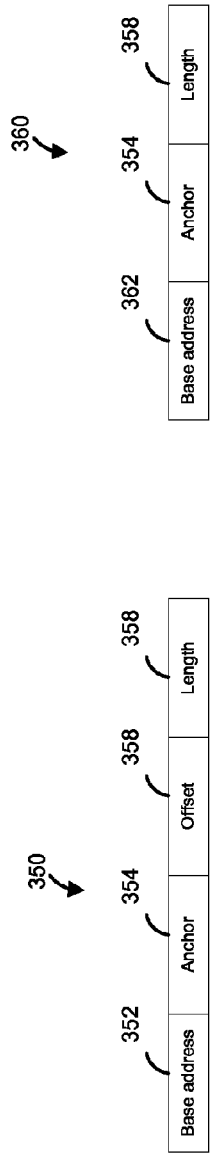
FIG. 3A
FIG. 3B
FIG. 3C

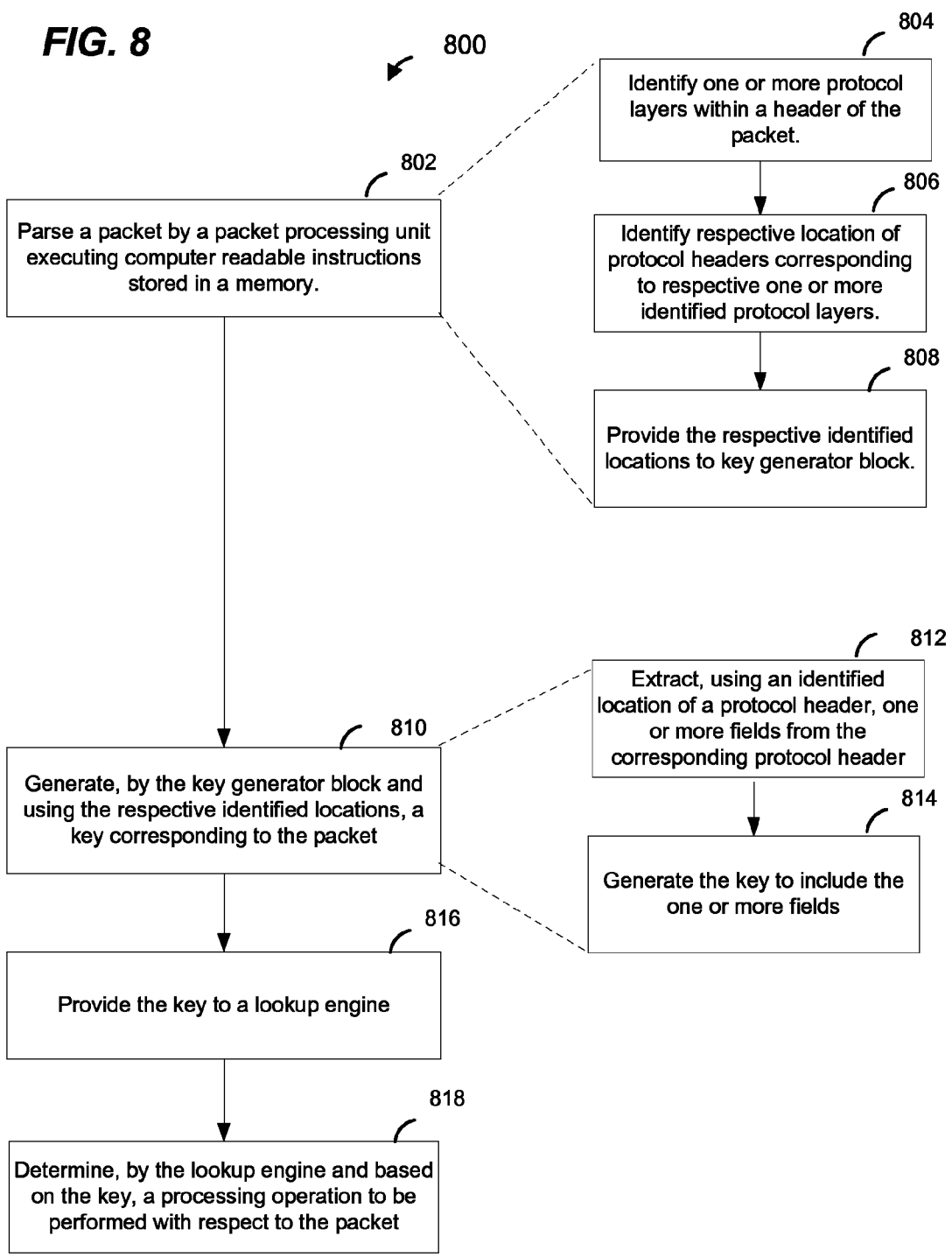

PACKET PARSING AND KEY GENERATION
IN A NETWORK DEVICE

CROSS-REFERENCE TO RELATED
APPLICATION

This disclosure claims the benefit of U.S. Provisional Patent Application No. 61/892,105, filed Oct. 17, 2013, entitled "High Performance Soft Parsing and Key Generation in a Programmable Packet Processor Architecture," the disclosure of which is hereby expressly incorporated herein by reference in its entirety.

FIELD OF THE DISCLOSURE

The present disclosure relates generally to network devices such as switches, routers, and edge devices, and more particularly to systems and methods for processing communication packets in such devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Some network devices, such as network switches, routers, edge devices and the like employ parallel packet processing in which multiple programmable packet processing elements simultaneously and in parallel perform various processing operations on different packets. In other network devices, a pipeline architecture employs sequentially arranged programmable packet processing elements such that different packet processing elements in the pipeline may be processing different packets at a given time. In some such systems, the processing elements engage various external resources, such as hardware accelerators, for performing certain processing operations on the packets. In such systems, it is important to efficiently utilize the respective packet processing elements and to minimize latency when processing packets by the network devices. One type of operation that a network device needs to efficiently perform is the generation of one or more lookup keys, based on information in a packet, that are subsequently utilized when performing various packet processing operations on the packet.

SUMMARY

In an embodiment, a method for processing packets in a network device comprises parsing a packet by a programmable processing unit executing computer readable instructions stored in a non-transitory computer readable storage medium. Parsing the packet includes identifying, by executing instructions stored in the non-transitory computer readable storage memory, one or more protocol layers within a header of the packet, identifying, by executing instructions stored in the non-transitory computer readable storage memory, respective locations of protocol headers within the header of the packet, the respective locations corresponding to respective one or more identified protocol layers, and providing the respective identified locations of protocol headers within the header of the packet to a hardware key generator block configured to generate one or more keys for the packet based at least on information included in the packet. The method further comprises generating, by the key generator block and using the respective identified locations, a lookup key corresponding to the packet. Generating the lookup key includes extracting, using an identified location of a protocol header, one or more fields from the corresponding protocol header, and generating the lookup key to include the one or more fields. The method additionally comprises providing the lookup key to a lookup engine, and performing, by the lookup engine and based on the lookup key, a lookup operation with respect to the packet.

In another embodiment, a network device comprises a plurality of network ports configured to receive and to transmit packets on a network. The network device also comprises one or more packet processing nodes. The one or more respectfully one or more packet processing nodes respectively comprise a processing unit configured to execute computer readable instructions stored in a non-transitory computer readable medium and a hardware key generator block coupled to the packet processing node. The computer readable instructions stored in the non-transitory computer readable medium, when executed by the processing unit, cause the processing unit to parse a packet to identify at least a first protocol layer within a header of the packet, and identify a location, within the header of the packet, of a protocol header corresponding to the first protocol layer. The hardware key generator block is configured to extract, using the identified location, one or more header fields from the protocol header, and generate a lookup key to include the one or more header fields. The network device additionally comprises a lookup engine coupled to the key generator block, the lookup engine configured to perform, based on the lookup key, a lookup operation on the packet.

BRIEF DESCRIPTION OF THE DRAWINGS

FIGS. 2A-2D are diagrams of several example packet formats that a network device supports and/or is configurable to support, according to an embodiment.

FIG. 3A is a diagram of an example memory used for storing a packet being processed by a network device, according to an embodiment.

FIG. 3B is a diagram of an example key segment field that identifies an example header field to be included in a key generated for a packet being processed by a network device, according to an embodiment.

FIG. 3C is a diagram of another example key segment field that identifies an example header field to be included in a key generated for a packet being processed by a network device, according to another embodiment.

FIG. 8 is a flow diagram of another example method for processing a packet in a network device, according to an embodiment.

DETAILED DESCRIPTION

Figure 1:
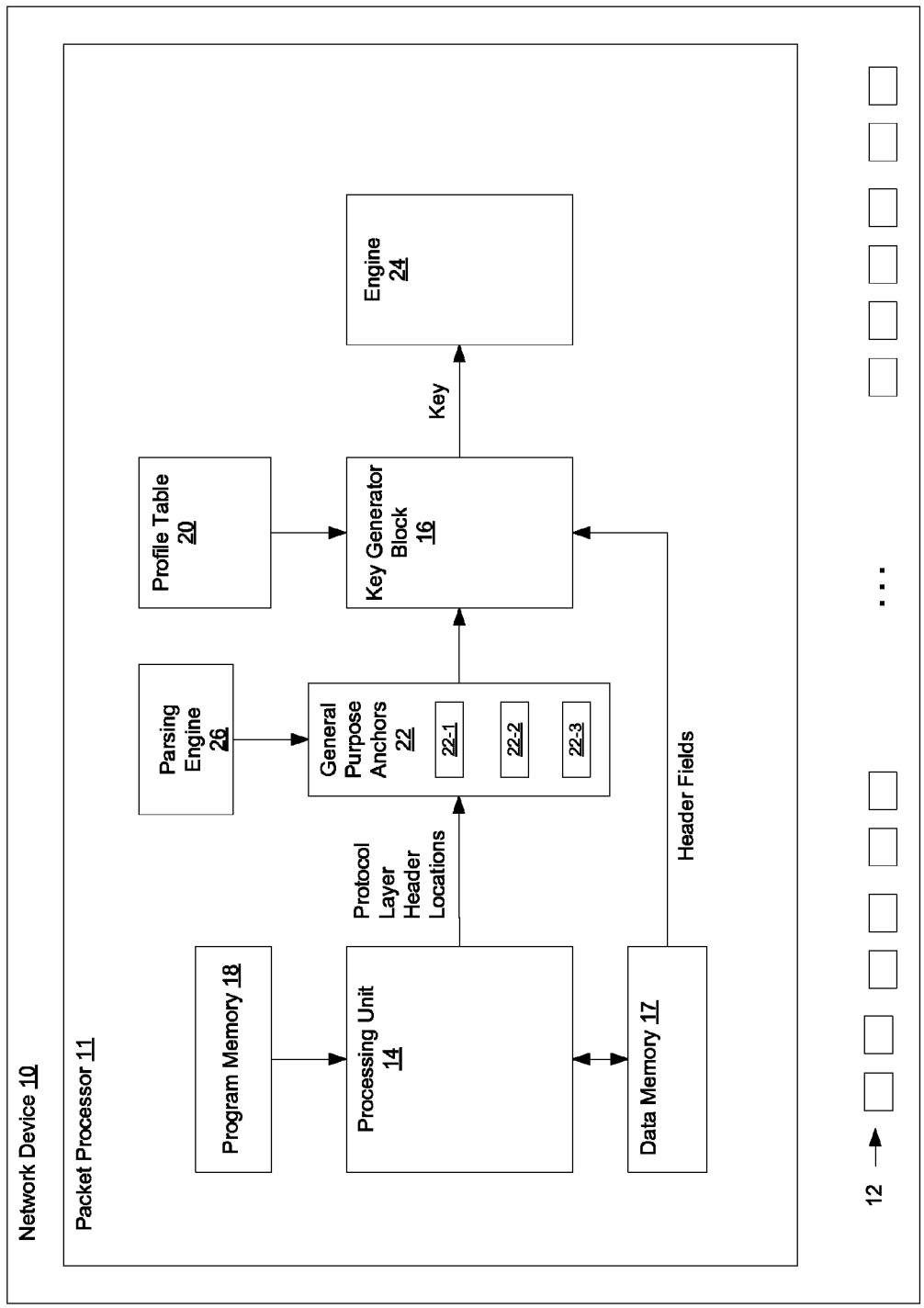
FIG. 1 is a simplified block diagram of an example network device 10 configured to employ flexible packet parsing and key generation techniques of the present disclosure, according to an embodiment.

FIG. 1 is a simplified block diagram of an example network device 10 configured to employ flexible packet parsing and key generation techniques of the present disclosure, according to an embodiment. The network device 10 is generally a computer networking device that connects two or more computer systems, network segments, subnets, and so on. For example, the network device 10 is a switch, in one embodiment. It is noted, however, that the network device 10 is not necessarily limited to a particular protocol layer or to a particular networking technology (e.g., Ethernet). For instance, the network device 10 could also be a bridge, a router, a VPN concentrator, etc.

The network device 10 includes a programmable packet processor 11 coupled to a plurality of network ports 12, and each of the network ports 12 is, in turn, coupled via a respective communication link to a communication network and/or to another suitable network device within a communication network. Generally speaking, the packet processor 11 is configured to process packets received via ingress ports 12, to determine respective egress ports 12 via which the packets are to be transmitted, and to transmit the packets via the determined egress ports 12. In some embodiments, the packet processor 11 processes packet descriptors associated with the packets rather than processing the packets themselves. A packet descriptor includes some information from the packet, such as some or all of the header information of the packet, and/or includes information generated for the packet by the network device 10, in an embodiment. In some embodiments, the packet descriptor includes other information as well such as an indicator of where the packet is stored in a memory associated with the network device 10. For ease of explanation, the term "packet" herein is used to refer to a packet itself or to a packet descriptor associated with the packet.

In an embodiment, during processing of a packet, the packet processor 11 generates one or more keys based on information included in and/or associated with the packet, and determines, based on the one or more keys, one or more processing operations to be performed with respect to the packet, such as trapping the packet or mirroring the packet to another processor (not shown) for further analysis, dropping or discarding the packet, determining an appropriate port 12 via which to forward the packet, updating an appropriate metering counter to account for the packet, etc. In an embodiment, to generate a key for a packet, the packet processor 11 extracts one or more fields from a header of the packet, and includes values of the one or more extracted fields in the key generated for the packet. In some embodiments, a location of a field within a header of the packet depends on various factors, such as a number of protocol layer encapsulations within the packet, types of protocols encapsulated within the packet, presence or absence of certain tags, such as virtual local area network (VLAN) tags, in a header of the packet, number of multiprotocol label switching (MPLS) labels in the header of the packet, etc. Thus, in order to generate a key for a packet, the packet processor 11 first determines locations of the one or more fields in the header of the packet, and then extracts the one or more header fields from the header of the packet using the determined locations, in various embodiments.

In an embodiment, a location of a field in a particular protocol layer header is set, or predetermined, relative to a start of the particular protocol layer header within the packet. However, the start of the particular protocol layer header depends on various factors such as a number, types and/or lengths of other protocol layer headers that precede the particular protocol layer header in the packet, in at least some embodiments. In an embodiment, the packet processor 11 identifies one or more protocol layers within a header of a packet, and determines offsets, with respect to a beginning of the packet, corresponding to respective beginning locations of the corresponding protocol layer headers. Then, to generate a key for the packet, the packet processor 11 extracts a particular field from a particular protocol layer header using the demined location of the beginning of the protocol layer header as an anchor into the protocol layer header, and a predetermined offset, with respect to the beginning of the protocol layer header, corresponding to the location of the particular field in the protocol layer header.

The packet processor 11 includes a processing unit 14 and a key generator block 16. The processing unit 14 is coupled to a data memory 17 and a program memory 18. In an embodiment, the data memory 17 is used to temporarily store information associated with a packet currently being processed by the packet processor 11. For example, the data memory 17 stores a packet descriptor associated with the packet currently being processed by the packet processor 11, in an embodiment. In an embodiment, the data memory 17 also stores data or information generated for the packet during processing of the packet by the packet processor 11, such as indications of processing operations to be performed with respect to the packet by the packet processor 11. The program memory 18 stores computer readable instructions executable by a processor, in an embodiment.

In an embodiment, the processing unit 14 is configured to process packets by executing computer readable instructions stored in the program memory 17. In an embodiment, the processing unit 14 is a microprocessor. In another embodiment, the processing unit 14 is a suitable processing unit other than a microprocessor. The key generator block 16, on the other hand, is implemented using one or more application-specific integrated circuits (ASICs) or other hardware components, in an embodiment.

In an embodiment, the processing unit 14 executes computer readable instructions to identify protocol layers within a header of a packet, and to determine respective locations of corresponding protocol layer headers within the header of the packet. In an embodiment, the processing unit 14 identifies protocol layers in a packet, and/or determines protocol layer header locations within a header of the packet, by executing a state machine according to which a particular protocol layer and/or a location of a particular protocol layer header within the packet is determined based on one or more header fields in protocol layer header (or headers) preceding the particular protocol layer header in the packet. The processing unit 14 then provides the determined protocol layer header location to the key generator block 16, in an embodiment. The key generator block 16 utilizes the determined protocol layer header location to obtain a value of a field in the protocol layer header, for example by accessing an appropriate memory location in which the corresponding field is stored in the data memory 17.

In an embodiment, the processing unit 14 provides the determined protocol layer header locations to the key generator block 16 by updating values of general purpose anchors 22 accessible by the key generator block 16. For example, the packet processor 11 includes one or more registers, or memory locations, for storing values of anchors corresponding to beginning locations of protocol layer headers determined during processing of a packet by the processing unit 14. To retrieve information from a field of a particular protocol layer header, the key generator block 16 obtains a value that indicates the location of the beginning of the particular layer header identified by the processing unit 14, and utilizes the value as an anchor into the particular layer header, in an embodiment. For ease of explanation, as used herein, the terms "anchor" or "general purpose anchor" are used interchangeably to refer to a location (e.g., a beginning) of a particular protocol layer header and a register or a memory location used for storing an indication of the location of the particular protocol header. The key generator block 16 utilizes the determined protocol layer header location to retrieve appropriate protocol layer header fields from the header of the packet, in an embodiment.

In the example embodiment of FIG. 1, the packet processor 11 includes three general purpose anchors 22, a first general purpose anchor 22-1, a second general purpose anchor 22-2, and a third general purpose anchor 22-3. Three general purpose anchors 22 allow the packet processor 11 to make available, to the key generator block 16, up to three protocol layers within packets being processed by the packet processor 11, in an embodiment. In other embodiment, the packet processor 11 includes other suitable numbers (e.g., 1, 2, 4, 5, 6, 7, 8, etc.) of general purpose anchors 22. In some such embodiments, greater numbers of general purpose anchors 22 allow the packet processor 11 to make available, to the key generator block 16, greater numbers of protocol layer headers within packets being processed by the packet processor 11, allowing key generation using fields of deeper protocol layers of packets being processed by the packet processor 11, in at least some embodiments.

In an embodiment, the general purpose anchors 22 do not globally correspond to any specific protocol layer headers. Rather, the processing unit 14 updates values of the general purpose anchors 22 based on protocol layers identified in a packet during processing of the packet by processing unit 14, in an embodiment. Thus, a particular general purpose anchor 22 corresponds to a first protocol layer for a first packet processed by the processing unit 14, and corresponds to a second protocol layer for a second packet processed by the processing unit 14, in an example embodiment. For example, a general purpose anchor (e.g., the general purpose anchor 22-1) indicates a location of an internet protocol (IP) header for a first packet processed by the processing unit 14, and indicates a location of an MPLS header in a second packer processed by the processing unit 14, in an example embodiment. Further, the processing unit 14 updates values of one or more of the general anchors 22 more than one time during processing of a packet, for example when the processing unit 22 re-parses a packet after performing tunnel termination processing of the packet, in some embodiments and/or scenarios. In such embodiments and/or scenarios, a general purpose anchor 22 can correspond to different protocol layer headers within a packet at different stages of processing of the packet. For example, a general purpose anchor 22 (e.g., the general purpose anchor 22-1) indicates a location of an internet protocol (IP) header when parsing of a packet is performed prior to tunnel termination of a header of the packet, and indicates a location of an MPLS header after parsing of the packet is performed after tunnel termination processing of the header of the packet, in some embodiments.

Because the processing unit 14 parses packets to identify protocol layers and locations of protocol headers within the packets by executing computer readable instructions, the processing unit 14 is configurable to process packets conforming to any network protocol or any combination of network protocols, including protocols developed in the future. Parsing of a packet, in this manner, is performed relatively infrequently during processing of a packet, in various embodiments. For example, in one example embodiment or scenario, parsing of a packet, in this manner, is performed only one time during processing of the packet. In another example embodiment or scenario, parsing of a packet, in this manner, is performed twice during processing of a packet, a first time before tunnel termination processing of a header of the packet, and a second time after tunnel termination processing of the header of the packet. In other embodiment and/or scenarios, parsing of a packet, in this manner, is performed other suitable numbers (e.g., 3, 4, etc.) of times during processing of the packet. Key generation, on the other hand, is performed relatively more frequently during processing of the packet for use in performing various processing operations with respect to the packet, in at least some embodiments. In an embodiment, because header field extraction and key generation is performed by a hardware key generator block 16, header field extraction and key generation is performed more quickly compared to systems in which field extraction and/or key generation is performed by executing computer readable instructions, such as during parsing of the packet according to computer readable instructions. In at least some embodiments, parsing packets to identify protocol layer header locations in headers of the packet using computer readable instructions provides flexibility to the packet processor 11 to support various packet formats, including packet formats developed in the future. Further, performing header field extraction and key generation using a key generator block implemented in hardware reduces a processing load on the packet processing unit and 14 and allows the packet processor 11 to process packets more quickly and to introduce less processing latency into flows of packets entering the network device 100, in at least some embodiments and/or scenarios.

In an embodiment, the key generator block 16 includes, or is coupled to, a profile table 20. The profile table 20 includes a plurality of entries, each entry corresponding to a particular key, such as a forwarding lookup key, an longest prefix match (LPM) key, a policy control list (PCL) key, etc., that can be generated by the key generator block 16. For example, an entry of the profile table 20 corresponding to a key includes indications of one or more header fields to be included in one or more segments of the key, in an embodiment. Each header field to be included in a key is identified in the profile table 20 by an anchor corresponding to a protocol layer header from which the header field is to be obtained, and an offset of the header field relative to the anchor corresponding to the protocol layer header, in an embodiment. In an embodiment, to generate a key, the key generator block 16 accesses an entry, in the profile table 20, corresponding to the key, wherein the entry indicates to the generator block 18 which of general purpose anchors 22 should be used to retrieve an appropriate header field to be included in the key. The key generator block 16 utilizes the value of the general purpose anchor 22 indicated in the entry, and an offset with respect to the value of the general purpose anchor 22, to retrieve the appropriate header field from the header of the packet, in an embodiment. In an embodiment, the value of the general purpose anchor 22 depends on the particular packet being processed by the packet processor 11, and may be different for different packets processed by the packet processor 11. Because the value of the general purpose anchor 22 is updated, by the processing unit 14, to indicate the location of the protocol layer header in the particular packet for which the key is being generated by the key generator block 16, the key generator block 16 extracts information from the correct location within the particular packet, in an embodiment. Several example formats, and identification of protocol layers and protocol layer header locations within packets that conform to the example packet formats, according to some embodiments, are described below with respect to FIGS. 2A-2D.

In some embodiments, the processing unit 14 is configured to override one or more fields to be included in a key in some situations. In an embodiment, to override a field to be included in a key, the processing unit 14 provides, to the key generator block 16, header field information, such as anchor and offset information, corresponding to a new header field to be included in the key. For example, the packet processor 11 includes one or more "key segment override" registers or memory locations (not shown) accessible by the key generator block 16, in an embodiment. To provide new information corresponding to a key segment to be used for a particular key, the processing unit 14 updates values of key segment override registers with information corresponding to the new header field to be included in the key segment, in this embodiment. The key generator block 16 then generates the key utilizing the new information provided by the processing unit 14 in place of the corresponding information stored in the profile table 20, in an embodiment.

Upon generating a key for a packet, the key generator block 16 provides the key to an engine 24 (e.g., a lookup engine), in an embodiment. In an embodiment, the engine 24 obtains (e.g., from a table in a memory) based on the key an indication of a processing operation to be performed with respect to the packet by the packet processor 11. The packet processor 11 (e.g., the processing unit 14 of the packet processor 11) performs the indicated processing operation with respect to the packet, in an embodiment.

FIGS. 2A-2D are diagrams of several example packet formats 50-90 that network device 10 of FIG. 1 supports and/or is configurable to support, according to an embodiment. In other embodiments, the network device 10 of FIG. 1 supports and/or is configurable to support only some of the example packet formats 50-90 and/or is configured and/or configurable to support suitable packet formats other than the example packet formats 50-90. Turning first to FIG. 2A, a packet format 50 corresponds to an Ethernet packet encapsulating an internet protocol (IP), such as an IP version 4 (IPv4) or IP version 6 (IPv6), packet encapsulating a transmission control protocol (TCP) packet. In an embodiment, a header 51 of the packet format 50 includes an Ethernet header 52, followed by an IP (e.g., IPv4 or IPv6) header 54, followed by a TCP header 56. In an embodiment, the processing unit 14 identifies the protocol layer headers 52-56, in a packet that conforms to the packet format 50, according to a parsing state machine that operates by reading values of various fields of the headers 52-56, and updating parser states according to the values of the header fields. In an embodiment, the processing unit 14 identifies a particular protocol layer within the header 51, and determines a location of a corresponding protocol layer header within the header 51, based one or more fields in one or more protocol layer headers preceding the particular protocol layer in the header 51. In an embodiment, the initial packet type corresponding to the packet format is predetermined and is known to the parser state machine that operates on the packet format 50. For example, the network device 10 is an Ethernet switch, in an embodiment. The processing unit 14 is configured to parse various Ethernet packet types, in this embodiment. The initial header type (in this case, Ethernet) is fixed as an initial state of the parsing state machine, in this embodiment.

In an embodiment, the processing unit 14 determines that an IP header (e.g., an IPv4 header or an IPv6 header) follows the Ethernet header 52 based on a value of a field in the Ethernet header 52. For example, the Ethernet header field 52 includes an Ethertype field that indicates the protocol layer (in this case, an IP layer) that follows the Ethernet header 52, in an embodiment. The processing unit 14 identifies that the IP header 54 follows the Ethernet header 54 based on the value of the Ethertype field of the header 52, in this embodiment. Additionally, the processing unit 14 determines a location of the IP header 54. For example, the processing unit 14 determines an offset, with respect to the beginning (e.g., first byte) of the packet, of the beginning (e.g., first byte) of the IP header 54. The offset of the IP header 54 depends on the length of the Ethernet header 52, in an embodiment. The length of the Ethernet header 52 varies based on, for example, presence or absence of various tags, such as VLAN tags, in the Ethernet header 52, in an embodiment. The processing unit 14 determines the length of the Ethernet header 52 based on presence or absence VLAN tags in the Ethernet header 52 and/or the number of VLAN tags in the Ethernet header 52, and determines the location of the IP header 54 as an offset, from the beginning of the packet, corresponding to the length of the Ethernet header 52. Upon determining the location of the IP header 54, the processing unit 14 updates a value of a first anchor 22 to indicate the determined location of the IP header 54. For example, the processing unit 14 updates the value of the first anchor 22-1 to indicate the determined offset corresponding to the IP header 54, in an embodiment.

The processing unit 14 continues parsing of the packet by analyzing appropriate fields of the IP header 54, in an embodiment. In an embodiment, the processing unit 14 determines, based on one or more fields in the IP header 54, that the IP header 54 is followed by the TCP header 56. For example, the IP header 54 includes a "next protocol" field set to indicate TCP as the next protocol in the packet. In an embodiment, the processing unit 14 determines that the TCP header 56 follows the IP header 54 based on the value of the next protocol field of the IP header 54. The processing unit 14 also determines a location of the TCP header 56, in an embodiment. For example, the processing unit 14 determines the location of the TCP header 56 as an offset, with respect to the beginning of the packet, of the beginning of the TCP header 56, in an embodiment. In an embodiment, the processing unit 14 determines a length of the IP header 54 based on a "length" field in the IP header 54, and determines the offset of the TCP header 54 as a mathematical sum of the offset of the IP header 54, corresponding to the value of the first anchor 22-1, and the determined length of the IP header 54. Upon determining the location of the TCP header 56, the processing unit 14 updates a value of a second anchor 22 to indicate the determined location of the TCP header 56. For example, the processing unit 14 updates the value of the second anchor 22-2 to indicate the determined offset corresponding to the TCP header 56, in an embodiment.

Turning now to FIG. 2B, a packet format 60 includes an Ethernet layer, which encapsulates a multiprotocol label switching layer, which encapsulates an IP layer, which encapsulates a TCP layer. The packet format 60 includes a header 61, which includes an Ethernet header 62, followed by an MPLS header 64, followed by an IP header 66, followed by a TCP header 68. In an embodiment, the processing unit 14 parses a packet that conforms to the packet format 60 in a manner similar to parsing of a packet conforming to the packet format 50. In an embodiment, the processing unit 14 determines that the Ethernet header 62 is followed by the MPLS header 64 based on an Ethertype field of the Ethernet header 62 which indicates MPLS as the protocol layer that follows the Ethernet header 62. In an embodiment, the Ethertype field of the Ethernet header also indicates that the MPLS header 64 is flowed by the IP header 62. In another embodiment, the MPLS header indicates that the IP header 62 follows the MPLS header 62. The IP header 64 includes a "next protocol" field that indicates the UDP protocol as the next layer protocol in the packet, in an embodiment. The processing unit 14 determines, based on the "next protocol" field of the IP header 62 that the IP header 62 is followed by the UDP header 64, and determines a location of the UDP header 64, in an embodiment. In an embodiment, the processing unit 14 determines the location of the UDP header 64 as an offset, from the beginning of the packet, of the beginning of the UPD header 64. In an embodiment, the processing unit 14 determines the offset as a mathematical sum of the beginning of the IP header 64 (i.e., the value of the second anchor 22-2) and a length of the IP header 64 as indicated by a length field in the IP header 64. The processing unit 64 then updates a value of a third anchor, such as the anchor 22-3, to indicate the determined offset of the UDP header 66, in an embodiment.

Turning now to FIG. 2C, the packet format 70 corresponds to a tunnel terminated packet. In particular, in the example embodiment of FIG. 3C, an Ethernet encapsulating IP encapsulating TCP packet is tunneled within an Ethernet encapsulating a transparent interconnection of lots of links (TRILL) protocol packet. The packet format 70 includes a packet header 71 which includes a first Ethernet header 72, followed by a TRILL header 74, followed by a second Ethernet header 76, followed by an IP header 78, followed by a TCP header 80. In an embodiment, the processing unit 14 processing a packet conforming to the packet format 70 in a manner similar to a packet conforming to the packet format 300 described above. In an embodiment, the processing unit 14 identifies protocol layers within the header 71, determines locations (e.g., offsets with respect to the beginner of the packet) of the corresponding protocol headers within the header 71, and updates general purpose anchors 22 to indicate the determined locations of the protocol layers within the header 71. In an embodiment, the processing unit 14 identifies a particular protocol layer within the header 71, and determines a location of a corresponding protocol layer header within the header 71, based one or more fields in one or more protocol layer headers preceding the particular protocol layer in the header 71. Upon determining a location of a protocol layer header in the header 71, the processing unit 14 updates a value of a general purpose anchor 22 to indicate the location of the protocol layer header in the header 71. For example, the processing unit 14 updates the first anchor 22-1 to indicate a location of the TRILL header 74, updates the second anchor 22-2 to indicate a location of the second Ethernet header 76, and update the third anchor 22-2 to indicate a location of the IP header 78, in an embodiment.

In some embodiments, the processing unit 14 performs tunnel termination with respect to a packet conforming to the packet format 70 by removing the Ethernet header 72 and the TRILL header 74 from the packet header 71. In some such embodiments, the processing unit 14 then parses the tunnel terminated packet, to identify protocol layers and to determine locations of protocol payer headers in the tunnel terminated header. The processing unit 14 updates the values of the general purpose anchors 22 to indicate protocol header location determined according to parsing of the tunnel terminated header, in an embodiment. For example, the processing unit 14 updates the first anchor 22-1 to indicate the determined location of the IP header 78, and updates the second anchor 22-2 to indicate the determined location of the TCP header 80, in an embodiment. The key generator block 16 subsequently generates a key for the packet using a newly updated value of an anchor 22 to retrieve a field from the corresponding protocol layer header (e.g., from the TCP header 80), in an embodiment.

Turning now to FIG. 2D, the packet format 90 corresponds to a general format packet having protocols X, Y, Z and W, with the protocol X being the default outer protocol of the network device 10. The packet format 90 includes a packet header 91 which includes a first protocol layer header X 92, followed a second protocol layer header Y 94, followed by a third protocol layer header Z 96, followed by a fourth protocol layer header Z 98. In an embodiment, the processing unit 14 determines the identity of each protocol layer Y, Z, and W and/or determines a location of each of the protocol layer headers 94-96 corresponding to the protocol layers Y, Z and W in a manner similar to the formats discussed above with respect to packet formats 50, 60 and 70. For example, the processing unit 14 determines the identity of each protocol layer Y, Z, and W and/or determines a location of each of the protocol layer headers 94-96 corresponding to the protocol layers Y, Z and W based on one or more fields in protocol layer header (or headers) preceding the protocol layer Y, Z and Y. In an embodiment, the processing unit 14 updates values of anchors 22 to indicate the determined locations (e.g., offsets with respect to the beginning of the packet) of the protocol layer header 94-96 corresponding to the protocol layers Y, Z and W. For example, the processing unit 14 updates the first anchor 22-1 to indicate the determined location of the header 94 corresponding to the protocol layer Y, updates the second anchor 22-2 to indicate the determined location of the header 96 corresponding to the protocol layer Z, and updates the third anchor 22-3 to indicate the determined location of the header 98 corresponding to the protocol layer W, in an example embodiment.

The key generator block 16 subsequently generates one or more keys for the packet, wherein generating a key for the packet includes performing one or more of the following: extracting one or more fields from the header 94 using the value of the first anchor 22-1 as an anchor into the header 94, extracting one or more fields from the header 96 using the value of the first anchor 22-2 as an anchor into the header 96, and/or extracting one or more fields from the header 98 using the value of the first anchor 22-3 as an anchor into the header 96, in this embodiment.

Referring back to FIG. 1, in some embodiment, the network device 100 includes a packet parsing engine 26. The packet parsing engine 26 is implements using one or more application-specific integrated circuits (ASICs) or other hardware components, in an embodiment. The parsing engine 26 is configured to recognize at least some of the packet formats supported by the network device 10, in an embodiment. For example, in an embodiment, the parsing engine 26 is configured to recognize one or more of the packet formats 50-90 described above. In an embodiment, the packet parsing engine 26 parses a packet before the packet is provided to the processing unit 14. The packet parsing engine 26 identifies one or more protocol layers within a header of the packet, and determines corresponding protocol layer locations within the header of the packet, in an embodiment. In an embodiment, the packet parsing engine 26 updates one or more general purpose anchors with the protocol layer header locations identified by the packet parsing engine 26 and/or associates the identified protocol header locations with the packet, for example by including indications of the identified locations in a packet descriptor corresponding to the packet. In some embodiments, the processing unit 14, rather than the parsing engine 26, updates one or more general purpose anchors with the protocol header locations identified by the packet parsing engine 26 based indications of the protocol header locations identified by the packet parsing engine 26 included in the descriptor of the packet. Parsing the packet by the parsing engine 26 accelerates parsing of packets conforming to at least some (e.g., well known) packet formats, and offloads parsing of such packets from the processing unit 14, in some embodiments. Subsequently, during processing of the packet by the processing unit 14, the processing unit 14 updates values of some or all of the general purpose anchors 22, for example if the processing unit 14 determines that the values were incorrectly determined by the parsing engine 26, in some embodiments.

FIG. 3A is a diagram of an example memory 300 used for storing a packet being processed by a network device, such as the network device 10 of FIG. 1, and an example scenario of retrieving a particular field from the memory 300, according to an embodiment. In the illustrated example, a session initiation protocol (SIP) field is extracted from an IPv4 protocol layer header of the packet stored in the memory 300. In an embodiment, the memory 300 corresponds to the data memory 17 of the network device 10 of FIG. 1. In another embodiment, the data memory 300 is used with another suitable network device. As an example, the memory 300 is four bytes wide, in the illustrated embodiment. In other embodiments, the memory 300 has other suitable widths.

In an embodiment, a first byte of the packet being processed is stored at a location 302 of the memory 300. The first byte of the packet corresponds to the beginning of an Ethernet header within a header of the packet, for example, in an embodiment. Further, the first byte of an IP header (e.g., IPv4 header) is located a memory location 304 of the memory 300, and the first byte of the SIP field of the IPv4 header of the packet is stored at memory location 306 of the memory 300, in the illustrated embodiment.

In an example scenario, the key generator block 16 receives a request for a particular engine operation (e.g., a lookup operation) to be performed based on a key generated for the packet stored in the memory 300. In an embodiment, the request includes an index identifying an entry, in the profile table 20, corresponding to the requested processing operation. The key generator block 16 accesses the profile table 20 and retrieves the indexed entry from the profile table 20, in an embodiment. The retrieved entry of the profile table 20 includes one or more key segment fields that identify one or more fields to be extracted from a header of the packet to be included in the key, in an embodiment. FIG. 3B is a diagram of an example key segment field 350 that identifies an example header field to be included in a key, according to an embodiment. In an embodiment, the entry retrieved from the profile table 20 includes one or more key segment fields such as the segment field 350. In the example embodiment of FIG. 3B, the key segment field 350 identifies a session initiation protocol (SIP) field from the IPv4 protocol layer header of the packet. In an embodiment, the key segment field 350 includes a base address subfield 350 that indicates a memory location of the first by of the packet in the data memory 17, an anchor subfield 354 that indicates which general purpose anchor 22 (e.g., the general purpose anchor 22-1) to use for extracting the SIP field from the IPv4 header of the packet, an offset subfield 356 that indicates an offset (e.g., a number of bytes), with respect to the first byte of the IPv4 protocol layer header, corresponding to a first byte of the SIP field in the IPv4 header of the packet, and a length subfield 358 that indicates the length (e.g., number of bytes) of the SIP field in the IPv4 header. FIG. 3C is a diagram of another example key segment field 360 that identifies an example header field to be included in a key, according to another embodiment. In the embodiment of FIG. 3C, the key segment field 360 combines the base address subfield 352 and the offset subfield 354 into a single base address subfield 362 that indicates a mathematical sum of the value of base address subfield 352 and the value of the offset subfield 356.

Referring again to FIG. 3A, in an embodiment, the value of the anchor indicated in the anchor subfield 352 is set during parsing of the packet by the processing unit 14 to indicate an offset of the first by of the IPv4 header from the beginning of the packet. In the example scenario of FIG. 3, the value of the anchor indicated by the anchor subfield 352 (e.g., the value of the anchor 22-1) is 18. Further, the value of the offset field 356 is 12, in the illustrated embodiment. In an embodiment, the generator block 14 determines an offset of the SIP field with respect to the first byte of the packet to be a sum of the value of the anchor indicated by the anchor field 354 and the value of the offset field 356 (in this case, 12+18=30). Alternatively, if the key segment field format 360 of FIG. 3C is used, the key generator block 16 determines the memory location 306 of the first byte of the SIP field as a sum of the value of the base address field 362 and the value of the anchor indicated by the anchor subfield 354, in an embodiment. In an embodiment, to retrieve the SIP field from the IPv4 header of the packet, the key generator block 14 retrieves a number of bytes indicated in the length subfield 358 (e.g., 4 bytes) beginning at the determined offset (e.g. 30 bytes) from the address indicated in the base address subfield 352, in an embodiment.

Figure 4:
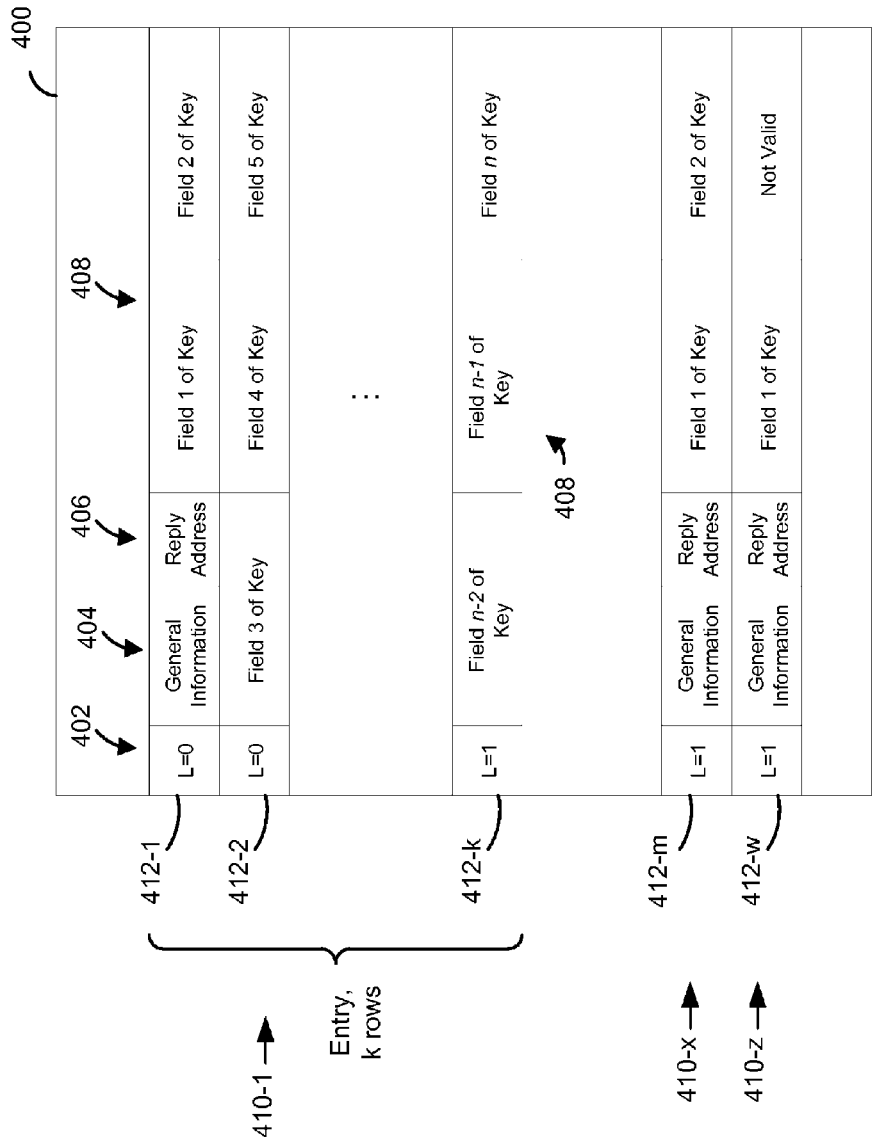
FIG. 4 is a diagram of an example profile table, according to an embodiment.

FIG. 4 is a diagram of an example profile table 400, according to an embodiment. The profile table 400 includes a plurality of entries, each entry corresponding to a particular key, such as a forwarding lookup key, an longest prefix match (LPM) key, a policy control list (PCL) key, etc., that can be generated during processing of a packet by a network device, such as the network device 10 of FIG. 1. For example, in an embodiment, an entry of the profile table 20 corresponding to a key includes indications of one or more header fields to be included in one or more segments of the key, and other information regarding the key, such as an indication of an accelerator engine configured to perform a processing operation (e.g., a lookup operation) based on the key, a memory location in which to store a result of the processing operation performed based on the key, etc. The profile table 400 corresponds to the profile table 20 of the network device 10 of FIG. 1, in an embodiment. In another embodiment, the example profile table 400 is used with another suitable network device.

In an embodiment, an entry corresponding to a particular key in the profile table 400 occupies one or more rows of the profile table 400, depending on the size of the key. For example, in the embodiment of FIG. 4 an entry 410 occupies k rows of the profile table 400, and each of the entries 410-x and 410-z occupies a single row of the profile table 400. In an embodiment, a first row of each entry corresponding to a key (or corresponding to a transaction that includes the key) also includes a general information field 404 and a reply address field 406. The general information field 404 includes general information about the transaction, such as, for example, an identifier of an engine (e.g., an accelerator engine 106) configured to perform the particular type of processing operation requested by the transaction. The reply information field 406 indicates where to store a result of the processing operation when the result is received from the engine. For example, in an embodiment, the response field indicates an address of a memory location, such as a memory location in the data memory 17 (FIG. 1) at which the result of the processing operation is to be stored when the result is received from the engine.

In an embodiment, each row of the profile table 400 includes one or more key segment fields 408 that specify which information is to be included in one or more segments of the key generated for the transaction. In an embodiment, each key segment field 408 is formatted as the example key segment field 350 of FIG. 3B. In another embodiment, each key segment field 408 is formatted as the example key segment field 360 of FIG. 3C. In an embodiment, each row of the profile table 400 is configured to hold a maximum number x of key segment fields 408. For example, a first row corresponding to an entry for a transaction is configured to hold a maximum of two key segment fields 408, and each following row corresponding to the entry, if any, includes a maximum of three key segment fields 408. In the example embodiment of FIG. 4, the first row 412-1 of the entry 410-1 includes two key segment fields 408, and each of the rows 412-2 to 412-k includes three key segment fields 408. The entry 410-x of the profile table 400 comprises a single row 412-m that includes two key segment fields 408, in the illustrated embodiment. The entry 410-z comprises a single row 412-w that includes only one key segment field 408. The second key segment field in the row 412-w does not hold any information, as indicated by "not valid" in the place of the second key segment field, in the illustrated embodiment.

In an embodiment, each row of the profile table 400 includes a "last" field 402 that indicates whether or not the row is a last row of an entry in the profile table 400. For example, a value of a logic one ("1") in the field 402 in a row of the table 400 indicates that the row is the last row of a particular entry in the profile table 400, and a value of a logic zero ("0") in the field 402 in a row of the table 400 indicates that the row is not the last row of a particular entry in the profile table 400, or vice versa, in an embodiment. For example, the entry 410-1 of the example profile table 400 includes k rows 412. A respective "last" field 402 of each of the k rows 412, except for the last row 412-k, indicates that the corresponding row is not the last row of the entry 410 as indicated by "L=0" in each of the rows 412 except for the row 412-k, in the illustrated embodiment. The "last" field 402 of the row 412-k indicates that row 412-k is the last row of the entry 410 as indicated by "L=1" in the row 412-k, in the illustrated embodiment. In an embodiment, to retrieve a particular entry from the profile table 400, a key generator block (e.g., the key generator block 16 of FIG. 1) extracts a first row corresponding to the entry, and determines based on a value of the "last" field 402 of the first row of the entry whether or not the retrieved first row is the last row of the entry. If the key generator block determines that the first row is not the last row of the entry, the key generator block retrieves the following row in the profile table 400 and determines, based on the "last" field of the following row whether the following row is the last row of the entry. The key generator block continues retrieving following rows of the profile table 400 until the key generator block retrieves the last row of the entry, and determines based on the "last" field 402 of the retrieved row that the retrieved row is the last row of the entry, in an embodiment.

Because key segment fields 402 corresponding to relatively longer keys are distributed among multiple rows of the profile table 400, each row of the profile table 400 need not accommodate a longest key (e.g., a key with the greatest numbers of segments) supported by the profile table 400. As a result, distributing key segment fields 402 corresponding to relatively longer keys results in better utilization of the memory used for storing the profile table 400 compared to a system in which the profile table 400 is configured such that each row is capable of holding all segments if of a maximum length key supported by the profile table 400, in at least some embodiments.

Figure 5:
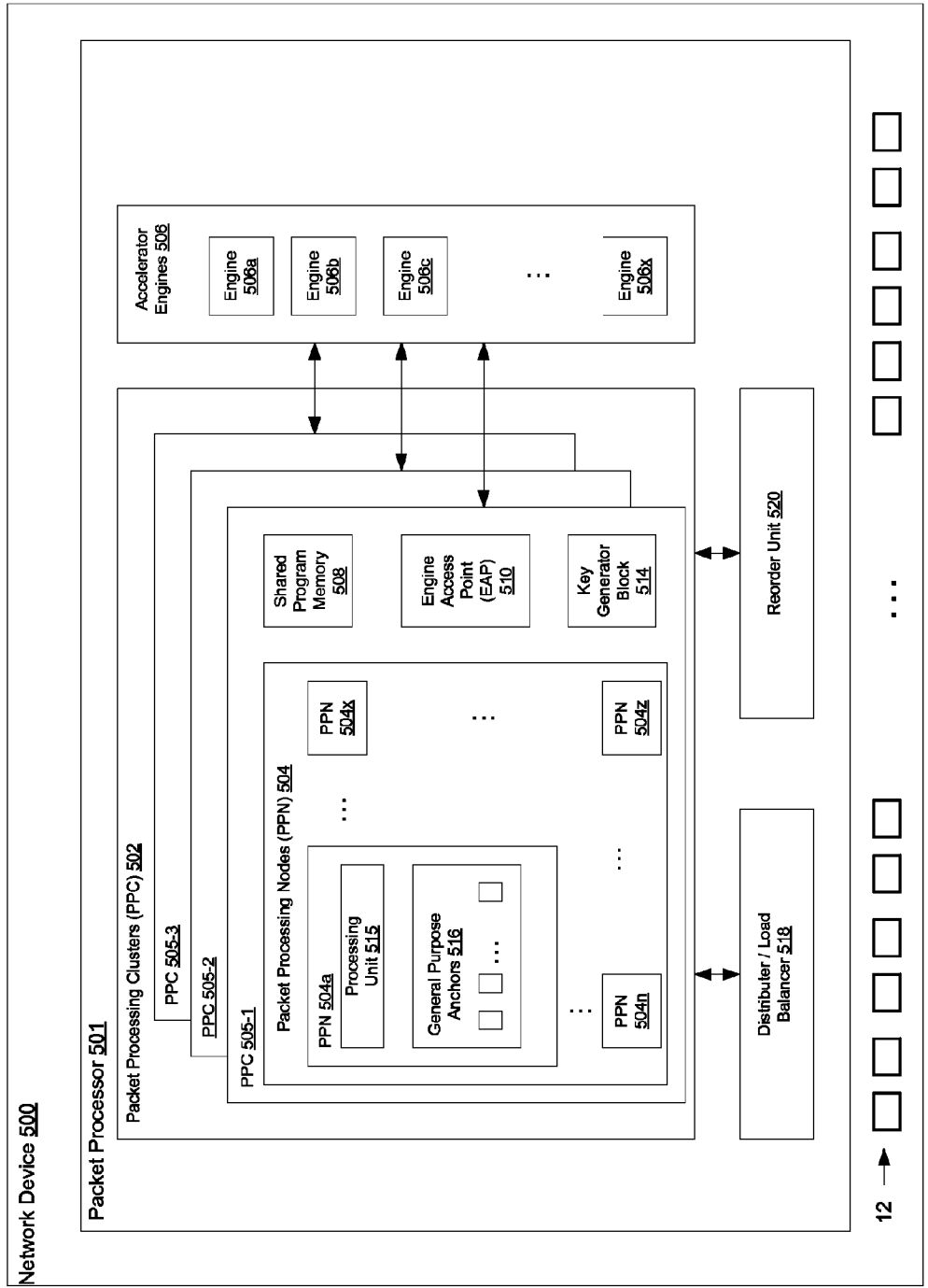
FIG. 5 is a block diagram of another network device configured to employ flexible packet parsing and key generation techniques of the present disclosure, according to another embodiment.

FIG. 5 is a block diagram of another network device 500 configured to employ flexible packet parsing and key generation techniques of the present disclosure, according to another embodiment. The network device 500 is similar to the network device 10, except that the packet processor 501 of the network device 500 includes a plurality of programmable packet processing nodes 504 rather than the single processing unit 14 of packet processor 11 of FIG. 1. In an embodiment, the PPNs 504 are configured to concurrently, in parallel, perform processing of packets received by the network device 500 via the ports 12. The packet processor 502 also includes a plurality of external processing engines 506. The external processing engines 506 are configured to perform certain processing operations with respect to packets processed by the PPNs 504. The PPNs 504 are configured to selectively engage the external engines 506 for performing the certain processing operations with respect to the packets being processed by the PPNs 504, in an embodiment. For example, the external processing engines 506 are configured to perform processing operations with respect to the packets based on keys (e.g., lookup operations) generated for the packets. In an embodiment, the plurality of external processing engines 506 include one re more lookup engines the same as or similar to the engine 24 of FIG. 1.

In the embodiment of FIG. 5, the packet processing nodes 504 are arranged in a plurality of packet processing clusters (PPCs) 505. In an embodiment, PPNs 504 of a cluster 505 share certain resources of the network device 500. For example, each PPC 505 includes a respective shared program memory 508, a respective engine access point (EAP) 510, and a respective key generator block 514 shared by the PPNs 504 in a PPC 505. In an embodiment, a shared program memory 508 of a cluster 505 stores computer readable instructions for performing processing operations on packets, and the PPNs 504 in the cluster 505 execute the computer readable instructions to process packets provided for processing to the cluster 505. The EAP 510 in a cluster 505 serves as an interface between the PPNs 504 in the cluster 505 and the external processing engines 506, in an embodiment. For example, the EAP 510 is configured to manage transactions between the PPNs 504 of the cluster 505 and the accelerator engines 506, in an embodiment. The key generator block 514 is configured to generate keys for the packets being processed by the PPNs 504 to be provided to the external accelerator engines 506, in an embodiment. Although the key generator block 514 is illustrated in FIG. 5 as separate from the EAP 510, the key generator block 514 is included in the EAP 510, in some embodiments. Alternatively, a respective key generator block 514 is included in each of the PPNs 504 and is responsible for generating keys for packets being processed by the corresponding PPNs 504, in some embodiments.

According to an embodiment, the PPNs 504 of a cluster 505 are configured to execute the computer readable instructions stored in the program memory 508 to process packets provided for processing to the PPNs 504 of the cluster 505. In an embodiment, each PPN 504 is configured to perform multiple different processing operation of the packet. In some embodiments, each PPN 504 is configured to perform all necessary processing (run to completion processing) of a packet, or to perform at least a portion of processing of a packet. The external processing engines 506, on the other hand, are implemented using application-specific integrated circuits (ASICs) or other hardware components, and each external processing engine 506 is dedicated to performing a single, typically processing intensive operation, in an embodiment. As just an example, in an example embodiment, a first external processing engine 506 (e.g., the engine 506*a*) is a forwarding lookup engine, a second external processing engine 506 (e.g., the engine 506*x*) is a policy lookup engine, a third external processing engine 506 (e.g., the engine 506*n*) is a cyclic redundancy check (CRC) calculation engine, etc.

During processing of the packets, the PPNs 504 selectively engage the external processing engines 506 for performing the particular processing operations on the packets. In at least some embodiments, the PPNs 504 are not configured to perform the particular processing operations that the external processing engines 506 are configured to perform. The particular processing operations that the external processing engines 506 are configured to perform are typically highly resource intensive and/or would require a relatively longer time to be performed if the operations were to be performed using a more generalized processor, such as a PPN 504 (or a more generalized processor included in a PPN 504), in at least some embodiments and/or scenarios. In at least some embodiments, employing the external processing engines 506 for performing the particular processing operations reduces the number and/or the size of the PPNs 504 needed by the network device 100, for example to support a certain bandwidth or line rate by the network device 100. In at least some embodiments and scenarios, it would take significantly longer (e.g., twice as long, ten times as long, 500 times as long, etc.) for a PPN 504 to perform a processing operation that an external processing engine 506 is configured to perform. As such, the external processing engines 506 assist PPNs 504 by accelerating at least some processing operations that would take a long time to be performed by the PPNs 504, in at least some embodiments and/or scenarios. Accordingly, the external processing engines 506 are sometimes referred to herein as "accelerator engines." The PPEs 504 are configured to utilize the results of the processing operations performed by the external processing engines 506 for further processing of the packets, for example to determine certain actions, such as forwarding actions, policy control actions, etc., to be taken with respect to the packets, in an embodiment.

In an embodiment, the PPNs 504 are configured to execute computer readable instructions stored in the shared memory 508 to parse the packets to identify protocol header locations within headers of the packet, as described above with respect to the processing unit 14 of FIG. 1. For example, a packet processing unit 515 of the PPN 504 executes computer readable instructions stored in the shared memory 508 to parse the packets to identify protocol header locations within headers of the packet, in an embodiment. In an embodiment, the packet processing unit 515 of the PPN 504 is the same as or similar to the processing unit 14 of FIG. 1. For example, the packet processing unit 515 is a microprocessor, in an embodiment. In another embodiment, the packet processing unit 515 is another suitable processing device.

In an embodiment, the PPNs 504 are configured to provide the identified protocol header locations to the key generator block 514, in an embodiment. For example, in an embodiment, each PPN 504 includes a plurality of general purpose anchors 516. In an embodiment, the general purpose anchors 516 correspond to the general purpose anchors 22 of FIG. 1. In an embodiment, the processing unit 515 of a PPN 504 updates the general purpose anchors 516 based on protocol layer locations identified for a packet being processed by the PPN 504. Subsequently, when the PPN 504 initiates a transaction with an accelerator engine 506 for performing a particular processing operation with respect to the packet, the key generator block 514 generates a key to be sent to the accelerator engine 506 using the protocol header locations within headers of the packet provided to the key generator block 514 by the PPN 504. In an embodiment, the key generator block 514 is the same as or similar to the key generator block 16 of FIG. 1. In an embodiment, the key generator block 514 utilizes a packet header location provided by the PPN 504 to retrieve an appropriate header field from the header of the packet to be included in the key in a manner the same as or similar to the key generator block 16 of FIG. 1. In another embodiment, the key generator block 514 utilizes one or more protocol layer header locations, identified for the packet by the PPN 504, in another suitable manner to generate a key.

In an embodiment, the network device 500 of FIG. 5 supports and/or is configurable to support example packet formats 50-90 described above with respect to FIG. 2. Various operations described below as performed by the processing unit 14 of the network device 10 of FIG. 1 are performed by the processing unit 515 of the network device 500, in some embodiments. Similarly, various operations described below as performed by the key generator block 14 of the network device 10 of FIG. 1 are performed by the processing unit 515, in some embodiments.

Although three PPCs 505 are illustrated in FIG. 5, the network device 500 includes other suitable numbers (e.g., 1, 2, 4, 5, 6, 7, etc.) of PPCs 505 in other embodiments. In an embodiment, PPNs 504 of a cluster share certain resources of network device 500. For example, each PPC 505 includes a respective shared program memory 508, in an embodiment. A shared memory 508 included in a cluster 505 is coupled to each PPN 504 in the cluster 505, in an embodiment. In an embodiment, the shared memory 508 included in a cluster 505 stores computer readable instructions for performing processing operations on packets, and the PPNs 504 in the cluster 505 are configured to process packets by executing instructions stored in the shared memory 508, in an embodiment. Each PPC 505 also includes a respective engine access point 510, in an embodiment. In an embodiment, an engine access point 510 included in a cluster 505 is coupled to each PPN 504 in the cluster 505. In an embodiment, the EAP 510 included in a cluster 505 serves as an interface between the accelerator engines 506 and the PPNs 504 in the cluster 505. In some embodiments, each PPC 505 includes multiple program memories 508 and/or multiple EAPs 510, each program memory 508 and/or EAP 510 coupled to a subset of PPNs 504. Further, in some embodiments, the PPNs 504 of the network device 500 are not arranged in clusters and/or do not share resources of the network device 500. For example, each PPN 504 includes or is coupled to a respective dedicated program memory 508 and a respective dedicated EAP 510, in an embodiment.

In an embodiment, the packet processor 501 also includes a distributor unit 518 and a reorder unit 520. The distributor unit 518 is configured to distribute processing of packets received via ports 512 to available PPNs 504, in an embodiment. Because processing of packets is distributed among multiple PPNs 504, and because the multiple PPNs 504 perform parallel processing of the packet, order of completion of processing of the packets by the PPNs 504 does not exactly correspond to the order in which the packets were received by the network device 500, in at least some embodiments and/or scenarios. In an embodiment, upon completion of processing of packets by PPNs 504, the PPNs 504 provide the packets to the reorder unit 520. The reorder unit 520 is configured to maintain order of the packets, at least within same data flows entering the network device 500, to ensure that these packets are transmitted from the network device 500 in the order in which the packets were received by the network device 500, in an embodiment. In an embodiment, the reorder unit 520 provides the packets to the appropriated egress ports 12 via which the packets are to be transmitted by the network device 500, and the network device 500 transmits the packets, in the order that the packets were received, from the appropriate egress ports 12.

Figure 6:
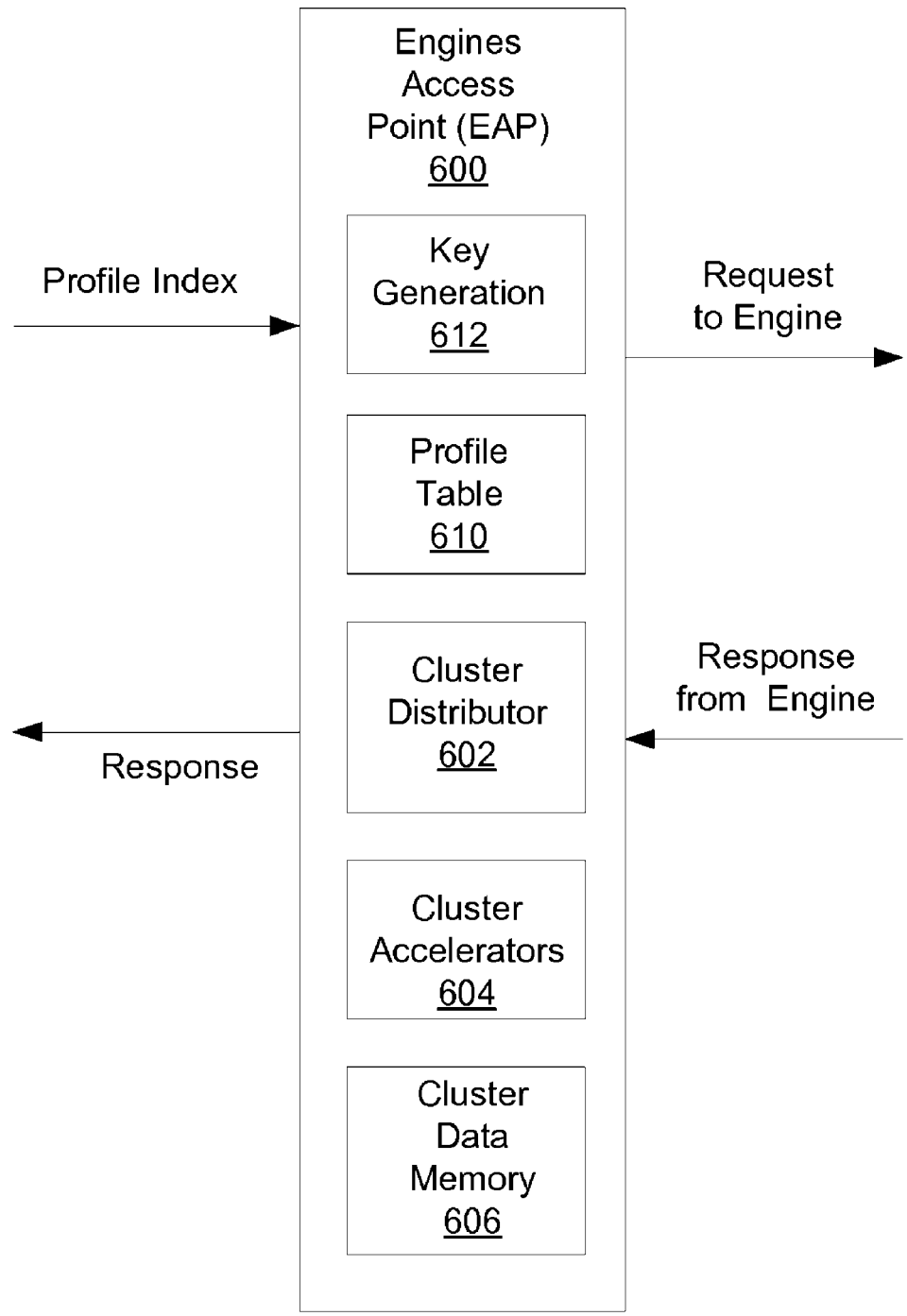
FIG. 6 is a block diagram of an engine access point (EAP) utilized with the network device of FIG. 5, according to an embodiment

FIG. 6 is a block diagram of an engine access point (EAP) 600 utilized with the network device 500 of FIG. 5, according to an embodiment. In an embodiment, the EAP 600 is used as the EAP 510 of FIG. 5. For illustrative purposes, the example EAP 600 is discussed with reference to the network device 500 of FIG. 5. In other embodiments, however, EAP 600 is utilized in a suitable network device different than the example network device 500 of FIG. 5.

In an embodiment, the EAP 600 corresponds to a packet processing cluster and is coupled to PPNs 104 included in the packet processing cluster. The EAP 600 includes a cluster distributor unit 602, cluster accelerator engines 604 and cluster data memory 606, in an embodiment. The cluster distributor is configured to distribute processing of packets provided to the packet processing cluster by the distributor 118, and to distribute processing packets among available PPNs 504 (FIG. 5) in the cluster. The cluster accelerator engines 604 include one or more accelerator engines that are local to the cluster. The accelerator engines 604 are generally similar to the accelerator engines 106 except that use of the accelerator engines 604 is limited to PPNs 504 within the cluster, in an embodiment. In an embodiment, the accelerator engines 604 are configured to perform processing operations that do not require memory accesses and/or memory lookups, while the accelerator engines 506 perform processing operation that require memory accesses and/or memory lookups. For example, the cluster accelerator engines 604 are configured to perform such operations as cyclic redundancy check calculations and/or other calculations with respect to packets being processed in the cluster 505-1, in an embodiment. As used herein, the terms "accelerator engine" and "external accelerator engine" encompass the accelerator engines 506 as well as the cluster accelerator engines 604.

In an embodiment, the cluster accelerator engines 604 include a packet parser configured to perform initial parsing of packets before providing the packets the packets to PPNs 504. For example, in an embodiment, the cluster accelerator engines 604 include a packet parser the same as or similar or similar to the packet parser 26 of FIG. 1.

The cluster data memory 606 stores information common to the PPNs 504 in the cluster 505-1, in an embodiment. For example, the data memory 506 stores configuration information common to the PPNs 104 in the cluster 505-1, in an embodiment. In an embodiment, the cluster data memory 606 also stores packets provided to the cluster 505-1 by the distributor 518 until processing of the packets is distributed to the PPNs 504 by the cluster distributor 602, in an embodiment. The cluster data memory also stores results of processing operations performed with respect to packets being processed by the PPNs 504 until the results are provided to the PPNs 504 that requested the processing operations, in an embodiment.

In an embodiment, the EAP 600 includes a profile table 610 and a key generator block 612. The profile table 610 includes a plurality of entries that include information for handling transactions for particular processing operations. For example, entries of the profile table 610 include information for generating requests, to be sent to accelerator engines 106, for performing the particular processing operations, in an embodiment. In an embodiment, an entry of the profile table 610 corresponding to a processing operation includes indications of one or more header fields to be included in one or more segments of a key generated as part of the transaction. Each header field to be included in a key is identified in the profile table 610 by an anchor corresponding to a protocol layer header from which the header field is to be obtained, and an offset of the header field relative to the anchor, in an embodiment. In an embodiment, the profile table 610 corresponds to the profile table 20 of FIG. 1 and/or to the profile table 400 of FIG. 4.

In an embodiment, to trigger an accelerator engine 506 for performing a particular processing operation with respect to a packet, a PPN 504 provides, to the EAP 600, an indication of the particular processing operation. For example, the PPN 504 provides, to the EAP 600, an index of an entry in the profile table 610 that corresponds to the particular processing operation. The EAP 600 receives the indication of the particular processing operation and accesses the profile table 610 based on the indication (e.g., using the indication as an index into the profile table 610), and retrieves, from the profile table 610, information needed to handle a transaction with the accelerator engine 506. Then, based on the information retrieved from the entry in the profile table 610, the EAP 600 generates a request for the processing operation, and directs the request to an appropriate accelerator engine 506 for performing the processing operation. In an embodiment, the key generator block 612 is configured to generate a key, corresponding to the processing operation, based on the information retrieved from an appropriate entry in the profile table 610 for generating the key. In an embodiment, the EAP 600 is configured to include the key generated by the generator block 612 in the request directed to the appropriate accelerator engine 506. In an embodiment, the key generator block 612 corresponds to the key generator block 16 of FIG. 1 and/or the key generator block 514 of FIG. 5.

The EAP 600 is also configured to receive a response of the transaction from the accelerator engine 506 that performed the processing operation with respect to the packet, the response containing the result of the processing operation. When the EAP 600 receives a result of the transaction, the EAP 600 causes the result of the processing operation to be written to a memory location indicated in the entry in the profile table 610, in an embodiment.

Figure 7:
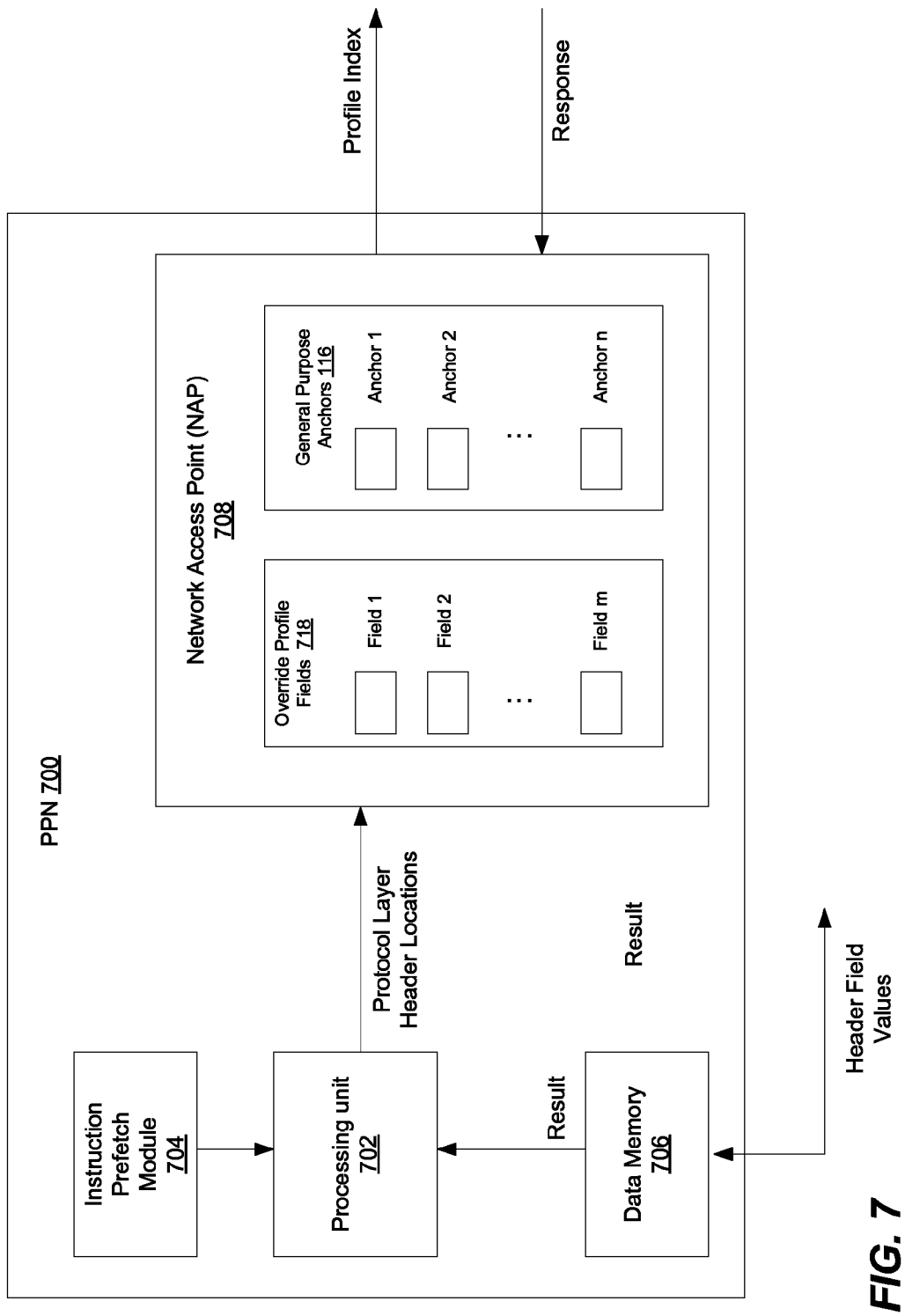
FIG. 7 is a block diagram of a packet processing node 700 that is utilized with the network device of FIG. 5, according to an embodiment.

FIG. 7 is a block diagram of a PPN 700 that is utilized as one of the PPNs 504 in the network device 500 of FIG. 5, according to an embodiment. For illustrative purposes, the example PPN 700 is discussed with reference to the network device 500 of FIG. 5. In some embodiments, however, PPN 700 is utilized in a suitable network device different than the example network device 500 of FIG. 5.

The PPN 700 includes a processing unit 702 coupled to an instruction prefetch module 704, a data memory 706 and a network access point (NAP) module 708. In an embodiment, the processing unit 702 is a processing device configured to perform packet processing operations selected from among a set of packet processing operations. In an embodiment, the processing unit 702 is a microprocessor. In another embodiment, the processing unit 702 is a processing unit other than a microprocessor. In an embodiment, the processing unit 702 corresponds to the processing unit 515 of FIG. 5. In another embodiment, the processing unit 702 is a processing unit different than the processing unit 515 of FIG. 5.

In an embodiment, the packet processing unit 702 performs packet processing operations by executing computer readable instructions stored in a non-transitory memory, such as the shared program memory 708. The instruction prefetch module 704 is configured to load, or "prefetches," sets of instructions from the memory 708, and the processor module 702 operates by executing the prefetched instructions. Prefetching sets of instructions allows the processing unit 702 to execute the instructions more quickly compared to systems in which a processing unit reads instructions directly from the memory that stores the instructions, in at least some embodiments. In another embodiment, however, the PPN 700 omits the prefetch module 704, and the processor module 702 operates by reading instructions directly from the memory 708.

The data memory 706 stores information needed for processing of a packet being processed by the PPN 700, in an embodiment. For example, the data memory 706 stores a packet descriptor corresponding to the packet being processed by the PPN 700, in an embodiment. Additionally, the data memory 706 stores data generated for the packet during processing of the packet by the network device 700, in an embodiment. The data generated for the packet during processing of the packet by the network device 100 is subsequently used by the processing unit 702 for further processing of the packet based on such data, in an embodiment. For example, the data memory 706 stores results of processing operations performed by accelerator engines 106 when the results are received by the PPN 700 from the accelerator engines 106, in an embodiment.

The NAP 708 is configured to interface with the processing unit 702 and with the EAP 600 to trigger accelerator engines 106 for performing processing operations, with respect to a packet, requested by the processing unit 702, according to an embodiment. For example, when the processing unit 702 initiates a transaction for a particular processing operation, the NAP 708 sends an indication of the particular processing operation to the EAP 600. The EAP 600 then accesses the profile table 610 using the indication of the particular processing operation as an index into the profile table 610, and generates a request for the particular processing operation based on information retrieved from the profile 610, in an embodiment. In effect, the processing unit 702 offloads generation of the request for the processing operation to the EAP 600, in an embodiment. In an embodiment, the NAP 708 is also configured to receive results of the processing operations performed by the accelerator engines 106, and to provide the results to the processing unit 702.

In an embodiment, the NAP 708 includes the general purpose anchors 516. In an embodiment, upon determining protocol layer header locations in a packet, the processing unit 702 updates values of the general purpose anchors 516 to indicate the determined header locations, as discussed above with respect to FIG. 5. In an embodiment, the NAP 708 also includes the override profile fields 718. In an embodiment, each of the profile override fields 718 conforms to the same format as the key segment field in the profile table 610, such as, for example, the key segment field 350 of FIG. 3B or the key segment field 360 of FIG. 3C. The processing unit 702 is configured to update values of the override profile fields 718 to override one or more segments of a key as discussed above with respect to the processing unit 14 of FIG. 1, in some embodiments and scenarios.

FIG. 8 is a flow diagram of an example method 800 for processing packets in a network device, according to an embodiment. The method 800 is implemented by the network device 10 of FIG. 1, in an embodiment. The method 800 is implemented by the network device 500 of FIG. 5, in another embodiment. In other embodiments, the method 800 is implemented by other suitable network devices.

At block 802, a packet is parsed by a processing unit executing computer readable instructions stored in a memory. In an embodiment, the packet is parsed by the processing unit 14 of the network device 10 of FIG. 1. In another embodiment, the packet is parsed by the processing unit 515 of the network device 500 of FIG. 5. In an embodiment, block 802 includes blocks 804-808.

At block 804, one or more layers are identified within a header of the packet. At block 806 respective locations of protocol headers are identified. In an embodiment, the one or more protocol headers correspond to the one or more protocol layers identified at block 804. In an embodiment, the a protocol layer at block 804 and/or a protocol layer header location at block 806 is determined based on one or more header fields in protocol layer header (or headers) preceding the particular protocol layer header in the packet. In an embodiment, an identified location of protocol header corresponds to a beginning (e.g., a first byte) of the protocol header.

At block 808, the one or more protocol header layer locations are provided to a key generator block. In an embodiment, providing the one or more protocol header layer locations to the key generator block comprises updating, with indications of the one or more protocol header layer locations, one or more general purpose anchors accessible by the key generator block.

At block 810, a key for the packet is generated by the key generator block. In an embodiment, the key for the packet is generated at block 801 using the one or more protocol header locations identified by the packet processing unit at block 806. In an embodiment, block 810 includes blocks 812 and 814.

At block 812, one or more fields from a protocol layer header are extracted. In an embodiment, the one or more fields are extracted using the corresponding protocol layer location, identified at block 806, to determine respective locations of the one or more fields. In an embodiment, the respective locations of the one or more fields are determined based on respective predetermined offsets, corresponding to the one or more fields, with respect to the identified location (e.g., with respect to the first byte) of the protocol header. At block 814, the key is generated to include the one or more fields extracted at block 812.

At block 816, the key generated at block 312 is provided to a lookup engine. For example, the key is provided to the lookup engine 22 of the network device 10 of FIG. 1, in an embodiment. The key is provided to an accelerator engine 506 of the network device 500 of FIG. 5, in another embodiment. In an embodiment, the key is included in a request that is set to an accelerator engine 506 as part of a transaction with the accelerator engine 106, in an embodiment. In other embodiments, the key is provided to other suitable engines. At block 818, a processing operation to be performed with respect to the packet is determined by the lookup engine based on the key generated at block 810.

In an embodiment, a method for processing packets in a network device comprises parsing a packet by a programmable processing unit executing computer readable instructions stored in a non-transitory computer readable storage medium. Parsing the packet includes identifying, by executing instructions stored in the non-transitory computer readable storage memory, one or more protocol layers within a header of the packet, identifying, by executing instructions stored in the non-transitory computer readable storage memory, respective locations of protocol headers within the header of the packet, the respective locations corresponding to respective one or more identified protocol layers, and providing the respective identified locations of protocol headers within the header of the packet to a hardware key generator block configured to generate one or more keys for the packet based at least on information included in the packet. The method further comprises generating, by the key generator block and using the respective identified locations, a lookup key corresponding to the packet. Generating the lookup key includes extracting, using an identified location of a protocol header, one or more fields from the corresponding protocol header, and generating the lookup key to include the one or more fields. The method additionally comprises providing the lookup key to a lookup engine, and performing, by the lookup engine and based on the lookup key, a lookup operation with respect to the packet.

In other embodiments, the method includes any one of, or any combination of one or more of, the following features.

Providing the respective identified locations to the key generator block comprises updating values of respective general purpose anchors, wherein the general purpose anchors do not globally correspond to specific protocol layers, and wherein a value of a general purpose anchor indicates an offset of a particular protocol layer in the header of the packet relative to a beginning of the packet.

The method further comprises subsequent to parsing the packet, performing tunnel termination of the packet to generate a tunnel-terminated packet, wherein performing tunnel termination of the packet includes removing one or more outer protocol layer headers from the packet;

The method further comprises parsing, by the processing unit executing computer readable instructions stored in a non-transitory computer readable storage medium, the tunnel-terminated packet, including identifying one or more protocol layers within a header of the tunnel-terminated packet, identifying respective locations of protocol headers within the header of the tunnel-terminated packet, the respective locations corresponding to respective one or more identified protocol layers, and providing the respective identified locations of protocol headers within the header of the tunnel-terminated packet to the key generator block.

Providing the respective identified locations of protocol headers within the header of the tunnel-terminated packet to the key generator block comprises updating values of the respective general purpose anchors with values corresponding to the tunnel-terminated packet.

Extracting, using the identified location of the protocol header, a field from the corresponding protocol header comprises determining a location of the field based on (i) the value of the general purpose anchor indicative of the offset of the particular protocol layer in the header of the packet relative to the beginning of the packet and (ii) a predetermined offset relative to the value of the general purpose anchor.

Generating the lookup key comprises retrieving an entry from a profile table, wherein the entry of the profile table identifies one or more header fields to be extracted from the header of the packet, the one or more header fields to be included in respective one or more segments of the lookup key, extracting the one or more header fields identified in the entry in the profile table, and generating the lookup key to include the one or more header fields.

Retrieving the entry from the profile table comprises retrieving the entry from two of more rows of the profile table, wherein each row of the two or more rows identifies one or more header fields to be included in respective one or more segments of the lookup key.

Each row, except for a last row, of the two or more rows of the entry includes an indication set to indicate that the row is not the last row of the entry, the last row of the two or more rows includes an indication to indicate that the row is the last row of the entry.

Retrieving the entry comprises (i) retrieving a first row of the entry, (ii) determining, based on the indication in the first row, that the first row is not the last row of the entry, (iii) retrieving a following row of the entry, (iv) determining, based on the indication in the retrieved following row, whether the following row is the last row of the entry, and if it is determined that the following row is not the last row of the entry, repeating steps (iii) and (iv) until it is determined that the retrieved following row is the last row of the entry.

The method further comprises overriding, by the processing unit, information identifying a new header field to be included on the lookup key, and wherein generating the lookup key comprises including the new header field in place of a header field identified in the entry.

Providing the respective identified locations of protocol headers within the header of the packet to the hardware key generator block comprises providing the lookup key to a key generator block implemented using one or more application-specific integrated circuits.

In another embodiment, a network device comprises a plurality of network ports configured to receive and to transmit packets on a network. The network device also comprises one or more packet processing nodes. The one or more respectfully one or more packet processing nodes respectively comprise a processing unit configured to execute computer readable instructions stored in a non-transitory computer readable medium and a hardware key generator block coupled to the packet processing node. The computer readable instructions stored in the non-transitory computer readable medium, when executed by the processing unit, cause the processing unit to parse a packet to identify at least a first protocol layer within a header of the packet, and identify a location, within the header of the packet, of a protocol header corresponding to the first protocol layer. The hardware key generator block is configured to extract, using the identified location, one or more header fields from the protocol header, and generate a lookup key to include the one or more header fields. The network device additionally comprises a lookup engine coupled to the key generator block, the lookup engine configured to perform, based on the lookup key, a lookup operation on the packet.

In other embodiments, the network device comprises any one of, or any combination of one or more of, the following features.

The one or more packet processing nodes are configured to provide the respective identified locations to the respective key generator blocks at least by updating values of respective general purpose anchors, wherein the general purpose anchors do not globally correspond to specific protocol layers, and wherein a value of a general purpose anchor indicates an offset of a particular protocol layer in the header of the packet relative to of a beginning of the packet.

The one or more packet processing node are configured to subsequent to parsing the packet, perform tunnel termination of the packet to generate a tunnel-terminated packet, wherein performing tunnel termination of the packet includes removing one or more outer protocol layer headers from the packet.

The one or more packet processing node are configured to parse the tunnel-terminated packet to identify one or more protocol layers within a header of the tunnel-terminated packet, identify respective locations of protocol headers within the header of the tunnel-terminated packet, the respective locations corresponding to respective one or more identified protocol layers, and provide the respective identified locations of protocol headers within the header of the tunnel-terminated packet to the respective key generator blocks.

The one or more programmable packet processing nodes are configured to provide the respective identified locations of protocol headers within the header of the tunnel-terminated packet to the respective key generator blocks at least by updating values of the respective general purpose anchors with values corresponding to the tunnel-terminated packet.

The key generator blocks is configured to determine a location of a field to be extracted from a protocol layer header based on (i) a value of the general purpose anchor that indicates a location of the protocol layer header and (ii) a predetermined offset relative to the value of the general purpose anchor.

The key generator blocks is configured to retrieve an entry from a profile table, wherein the entry of the profile table identifies one or more header fields to be extracted from the header of the packet, the one or more header fields to be included in respective one or more segments of the lookup key, extract the one or more header fields identified in the entry in the profile table, and generate the lookup key to include the one or more header fields.

The key generator blocks is configured to retrieve the entry of the profile table by retrieving two of more rows of the profile table, wherein each row of the two or more rows identifies one or more header fields to be included in respective one or more segments of the lookup key.

Each row, except for a last row, of the two or more rows of the entry includes an indication set to indicate that the row is not the last row of the entry, the last row of the two or more rows includes an indication to indicate that the row is the last row of the entry, The respective key generator blocks are configured to (i) retrieve a first row of the entry, (ii) determine, based on the indication in the first row, that the first row is not the last row of the entry, (iii) retrieve a following row of the entry, (iv) determine, based on the indication in the retrieved following row, whether the following row is the last row of the entry, and if it is determined that the following row is not the last row of the entry, repeat steps (iii) and (iv) until it is determined that the retrieved following row is the last row of the entry.

The one or more programmable packet processing nodes are further configured to override information identifying a new header field to be included on the lookup key, and wherein the key generator block is configured to generate the lookup key to include the new header field in place of a header field identified in the entry.

The respective key generator block are implemented using respective one or more application-specific integrated circuits.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable medium or media such as a magnetic disk, an optical disk, a RAM or ROM or flash memory, etc. The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A method for processing packets in a network device, the method comprising:
  parsing a packet by a programmable processing unit executing computer readable instructions stored in a non-transitory computer readable storage medium, including
    identifying, by executing instructions stored in the non-transitory computer readable storage memory, respective locations of protocol headers within a header of the packet, the respective locations corresponding to respective one or more protocol layers, and
    updating values of respective general purpose anchors to indicate the respective locations of the protocol headers, wherein the general purpose anchors do not globally correspond to specific protocol layers;
  generating, by a hardware key generator block and using the updated values of the respective general purpose anchors, a lookup key corresponding to the packet, including
    extracting, using an updated value of one of the general purpose anchors, one or more fields from one of the protocol headers, and
    generating the lookup key to include the one or more fields;
  providing the lookup key to a lookup engine; and
  performing, by the lookup engine and based on the lookup key, a lookup operation with respect to the packet.

2. The method of claim 1, wherein a value of a general purpose anchor indicates an offset of a particular protocol layer in the header of the packet relative to a beginning of the packet.

3. The method of claim 2, further comprising:
subsequent to parsing the packet, performing tunnel termination of the packet to generate a tunnel-terminated packet, wherein performing tunnel termination of the packet includes removing one or more outer protocol layer headers from the packet;
parsing, by the processing unit executing computer readable instructions stored in a non-transitory computer readable storage medium, the tunnel-terminated packet, including
identifying respective locations of protocol headers within a header of the tunnel-terminated packet, the respective locations corresponding to respective one or more protocol layers, and
providing the respective identified locations of protocol headers within the header of the tunnel-terminated packet to the hardware key generator block.

4. The method of claim 3, wherein providing the respective identified locations of protocol headers within the header of the tunnel-terminated packet to the hardware key generator block comprises updating values of the respective general purpose anchors with values corresponding to the tunnel-terminated packet.

5. The method of claim 2, wherein extracting, using the updated value of the one of the general purpose anchor, the one or more fields from the one protocol header comprises determining a location of a first field based on (i) the value of the one general purpose anchor indicative of the offset of the one protocol layer in the header of the packet relative to the beginning of the packet and (ii) a predetermined offset relative to the value of the one general purpose anchor.

6. The method of claim 1, wherein generating the lookup key comprises:
retrieving an entry from a profile table, wherein the entry of the profile table identifies one or more header fields to be extracted from the header of the packet, the one or more header fields to be included in respective one or more segments of the lookup key,
extracting the one or more header fields identified in the entry in the profile table, and
generating the lookup key to include the one or more header fields.

7. The method of claim 6, wherein retrieving the entry from the profile table comprises retrieving the entry from two of more rows of the profile table, wherein each row of the two or more rows identifies one or more header fields to be included in respective one or more segments of the lookup key.

8. The method of claim 7, wherein each row, except for a last row, of the two or more rows of the entry includes an indication set to indicate that the row is not the last row of the entry, the last row of the two or more rows includes an indication to indicate that the row is the last row of the entry, and wherein retrieving the entry comprises
(i) retrieving a first row of the entry,
(ii) determining, based on the indication in the first row, that the first row is not the last row of the entry,
(iii) retrieving a following row of the entry,
(iv) determining, based on the indication in the retrieved following row, whether the following row is the last row of the entry, and
if it is determined that the following row is not the last row of the entry, repeating steps (iii) and (iv) until it is determined that the retrieved following row is the last row of the entry.

9. The method of claim 6, further comprising overriding, by the processing unit, information identifying a new header field to be included in the lookup key, and wherein generating the lookup key comprises including the new header field in place of a header field identified in the entry.

10. The method of claim 1, wherein generating, by the hardware key generator block, the lookup key comprises generating the lookup key using one or more application-specific integrated circuits.

11. A network device, comprising:
a plurality of network ports configured to receive and to transmit packets on a network;
one or more packet processing nodes respectfully comprising
a processing unit configured to execute computer readable computer readable instructions stored in a non-transitory computer readable medium that, when executed by the processing unit, cause the processing unit to parse a packet to:
identify a location, within a header of the packet, of a protocol header corresponding to a first protocol layer, and
update a value of a general purpose anchor to indicate the location of the protocol header, wherein the general purpose anchor does not globally correspond to any specific protocol layer; and
a hardware key generator block coupled to the packet processing node, the hardware key generator block configured to
extract, using the updated value of the general purpose anchor, one or more header fields from the protocol header, and
generate a lookup key to include the one or more header fields, and
a lookup engine coupled to the hardware key generator block, the lookup engine configured to perform, based on the lookup key, a lookup operation on the packet.

12. The network device of claim 11, wherein the value of the general purpose anchor indicates an offset of the protocol header in the header of the packet relative to a beginning of the packet.

13. The network device of claim 11, wherein the one or more packet processing node are configured to:
subsequent to parsing the packet, perform tunnel termination of the packet to generate a tunnel-terminated packet, wherein performing tunnel termination of the packet includes removing one or more outer protocol layer headers from the packet;
parse the tunnel-terminated packet to
identify respective locations of protocol headers within the header of the tunnel-terminated packet, the respective locations corresponding to respective one or more identified protocol layers, and
provide the respective identified locations of protocol headers within the header of the tunnel-terminated packet to the hardware key generator block.

14. The network device of claim 13, wherein the one or more programmable packet processing nodes are configured to provide the respective identified locations of protocol headers within the header of the tunnel-terminated packet to the hardware key generator block at least by updating values of respective general purpose anchors with values corresponding to the tunnel-terminated packet.

15. The network device of claim 11, wherein the hardware key generator block is configured to determine a location of a first field to be extracted from the protocol header based on (i) the value of the general purpose anchor which indicates a location of the protocol header and (ii) a predetermined offset relative to the value of the general purpose anchor.

16. The network device of claim 11, wherein the hardware key generator block is configured to:
   retrieve an entry from a profile table, wherein the entry of the profile table identifies one or more header fields to be extracted from the header of the packet, the one or more header fields to be included in respective one or more segments of the lookup key,
   extract the one or more header fields identified in the entry in the profile table, and
   generate the lookup key to include the one or more header fields.

17. The network device of claim 16, wherein the hardware key generator block is configured to retrieve the entry of the profile table by retrieving two of more rows of the profile table, wherein each row of the two or more rows identifies one or more header fields to be included in respective one or more segments of the lookup key.

18. The network device of claim 17, wherein each row, except for a last row, of the two or more rows of the entry includes an indication set to indicate that the row is not the last row of the entry, the last row of the two or more rows includes an indication to indicate that the row is the last row of the entry, and wherein the hardware key generator block is configured to (i) retrieve a first row of the entry,
(ii) determine, based on the indication in the first row, that the first row is not the last row of the entry,
(iii) retrieve a following row of the entry,
(iv) determine, based on the indication in the retrieved following row, whether the following row is the last row of the entry, and
if it is determined that the following row is not the last row of the entry, repeat steps (iii) and (iv) until it is determined that the retrieved following row is the last row of the entry.

19. The network device of claim 16, wherein the one or more programmable packet processing nodes are further configured to override information identifying a new header field to be included in the lookup key, and wherein the hardware key generator block is configured to generate the lookup key to include the new header field in place of a header field identified in the entry.

20. The network device of claim 11, wherein the hardware key generator block is implemented using one or more application-specific integrated circuits.

* * * * *